United States Patent
Peh et al.

(10) Patent No.: US 8,812,564 B2
(45) Date of Patent: Aug. 19, 2014

(54) PARALLEL UNIQUENESS CHECKS FOR PARTITIONED TABLES

(75) Inventors: Thomas Peh, Heidelberg (DE); Wolfgang Stephan, Heidelberg (DE); Andreas Tonder, Weinheim (DE); Lars Fricke, Worms (DE); Christian Bensberg, Heidelberg (DE)

(73) Assignee: SAP AG, Walldorf (DE)

( * ) Notice: Subject to any disclaimer, the term of this patent is extended or adjusted under 35 U.S.C. 154(b) by 3 days.

(21) Appl. No.: 13/332,215

(22) Filed: Dec. 20, 2011

(65) Prior Publication Data

US 2013/0159265 A1 Jun. 20, 2013

(51) Int. Cl.
*G06F 17/30* (2006.01)

(52) U.S. Cl.
USPC .......................... 707/825; 707/968; 707/737

(58) Field of Classification Search
CPC .................... G06F 17/30584; G06F 17/30949; G06F 17/30339
USPC .................. 707/703, 704, 812, 825, 968, 737
See application file for complete search history.

(56) References Cited

U.S. PATENT DOCUMENTS

| | | | | |
|---|---|---|---|---|
| 7,962,458 | B2 * | 6/2011 | Holenstein et al. | 707/704 |
| 8,150,870 | B1 * | 4/2012 | Peddy et al. | 707/770 |
| 8,676,772 | B2 * | 3/2014 | Gislason | 707/696 |
| 2008/0059492 | A1 * | 3/2008 | Tarin | 707/707 |
| 2012/0109888 | A1 * | 5/2012 | Zhang et al. | 707/610 |
| 2013/0124466 | A1 * | 5/2013 | Naidu et al. | 707/610 |
| 2013/0151491 | A1 * | 6/2013 | Gislason | 707/696 |
| 2013/0318051 | A1 * | 11/2013 | Kumar et al. | 707/692 |

* cited by examiner

*Primary Examiner* — Robert Beausoliel, Jr.
*Assistant Examiner* — Alexandria Bromell
(74) *Attorney, Agent, or Firm* — Mintz Levin Cohn Ferris Glovsky and Popeo, P.C.

(57) ABSTRACT

An insertion of a record into a table that includes a primary key column and a second column that includes a global uniqueness constraint across all of a plurality of data partitions across which the table is split is initiated without checking that a value of the record in the second column is globally unique by contacting other partitions the one partition to which the record is to be added to. The insertion can be processed, at least in part by implementing a write lock on the one partition but without implementing a read lock on the other partitions. The write lock on the one partition can be released after the insertion is completed, after which the validity of the insertion can be verified, for example by examining the other parts and a delta partition corresponding to the table. The insertion can be undone if the insertion was not valid.

13 Claims, 7 Drawing Sheets

PARALLEL UNIQUENESS CHECKS FOR PARTITIONED TABLES

TECHNICAL FIELD

The subject matter described herein relates to manipulations of partitioned database tables, including but not limited to verifying uniqueness of values in non-primary key columns in such tables.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

In general, column-based systems are more efficient when an aggregate needs to be computed over many rows but only for a notably smaller subset of all columns of data, because reading that smaller subset of data can be faster than reading all data. Column-based systems can be more efficient when new values of a column are supplied for all rows at once, because that column data can be written efficiently and replace old column data without touching any other columns for the rows. Row-based systems can be more efficient when many columns of a single row are required at the same time, and when row-size is relatively small, as the entire row can be retrieved with a single disk seek. Row-based systems can also be more efficient when writing a new row if all of the column data is supplied at the same time, as the entire row can be written with a single disk seek.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores. For example, some modern compression schemes can make use of the similarity of adjacent data to compress. To improve compression of column-based data, typical approaches involve sorting the rows. For example, using bitmap indexes, sorting can often improve compression by approximately an order of magnitude. In conventional systems, columnar compression generally achieves a reduction in storage space requirements at the expense of efficiency of retrieval. Retrieving all data from a single row can be more efficient when that data is located in a single location, such as in a row-based architecture. Further, the greater adjacent compression achieved, the more difficult random-access may become, as data typically need to be uncompressed to be read. Therefore, conventional column-based architectures are often enriched by additional mechanisms aimed at minimizing the need for access to compressed data. These additional mechanisms can result in lower compression efficiency and/or increased processing requirements to access the compressed data.

Currently available relational database management systems can accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a method includes initiating an insertion of a record into a table that is split across a plurality of data partitions. The table includes a primary key column and a second column that includes a global uniqueness constraint across all of the plurality of data partitions. The insertion causes the record to be added to one partition of the plurality of partitions. The initiating occurs without contacting other partitions of the plurality of partitions to check that a value of the record in the second column is globally unique. The method also includes processing the insertion, at least in part by implementing a write lock on the one partition but without implementing a read lock on the other partitions. The write lock on the one partition is released after the insertion is completed, and a verification of whether the insertion was valid is performed. The verifying includes examining the other parts and a delta partition corresponding to the table. The insertion is undone if the insertion was not valid.

In some variations or the current subject matter, one or more of the following features can optionally be included in any feasible combination. The initiating can further optionally include a recipient node of a plurality of processing nodes each comprising at least one data partition of the plurality of data partitions receiving, a first data request comprising the insertion, identifying a target node of the plurality of processing nodes to handle the data request, and redirecting the data request to the target node so that the target node can act on the one partition in response to the data request. The first data request can optionally be received directly from a requesting machine without being handled by a master node. The determining can optionally include the recipient node applying partitioning information to determine one partition of the plurality of partitions to which the data request should be directed and mapping information associating each data partition of the plurality of data partitions with an assigned node of the plurality of processing nodes. The partitioning information and the mapping information can optionally be accessed from at least one of a local storage accessible to the recipient node and a metadata repository accessible to each of the plurality of processing nodes. The plurality of partitions can optionally be part of a multi-node data partitioning landscape that can optionally include data partitioning over at least two partitioning levels. The table can optionally be partitioned at a first level using a first partitioning specification and at a second level using a second partitioning specification. The table can optionally be partitioned at a first level into at least two first level partitions based on a first partitioning method. Each of the first level partitions can optionally be further partitioned at a second level into two or more second-level partitions based on a second partitioning method that is the same for all of the at least two first level partitions.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a partitioned database environment, a table that includes multiple columns can be spread across multiple partitions. The table by default generally includes a column that is defined as the primary key and whose values must be unique for each record in the table. However, in some cases, there can be an additional column or columns that that is/are constrained to have only a unique value for each record throughout the global table. While the primary key may be used as part of the determination of which partition in the partitioned database environment should hold any given data record in the table, a further uniqueness constraint on a second column in the table may not be as conveniently verified, particularly in a multi-node partitioned landscape in which data partitions are maintained across more than one node of a multi-node data partitioning landscape.

A conventional approach to handling potential uniqueness conflicts in columns other than the primary key column in a multi-node data partitioning landscape can include calling other nodes to determine whether a new value is unique globally. Such calls would need to be made whenever a data record is created or updated to a new value in the secondary unique column to ensure that the new value of the record does not duplicate that of a record on another partition administered by another node. This requirement can cause a substantial data traffic load and can also introduce substantial latency into operation of the database due to wait times for calls to other nodes and verification checks for the new value.

Figure 1:
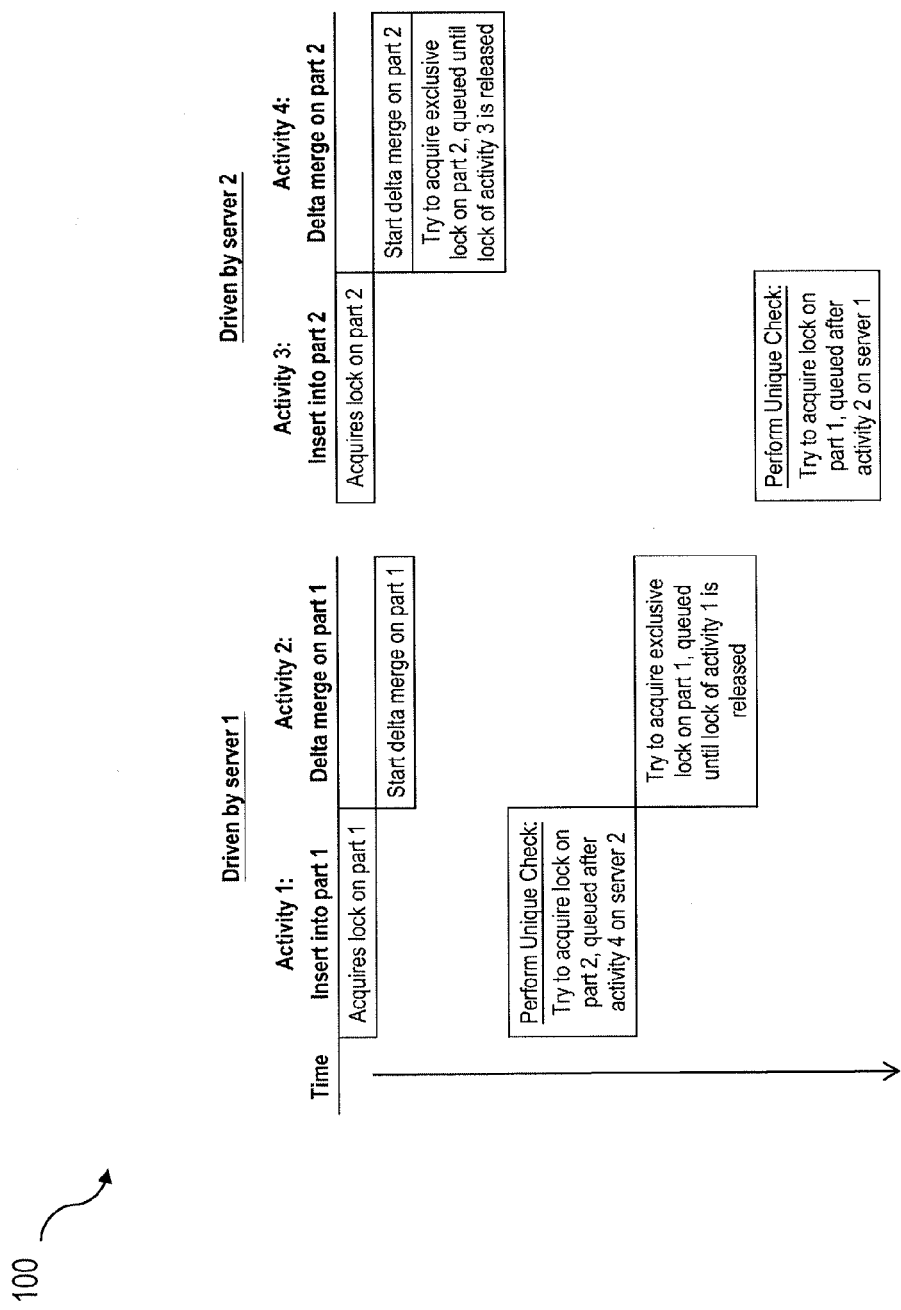
FIG. 1 is a state diagram illustrating an example of conflicting lock states in a partitioned database.

An example of the difficulties that can arise in such an arrangement is illustrated in the following hypothetical examples. A table split across two partitions experience two parallel insertion operations (in which a new record is added or an existing record is invalidated and replaced by a new version of the existing record containing an updated value. Due to parallel processing across multiple nodes, each insertion operation can be performed by a separate, parallel thread. As shown in the timeline chart 100 of FIG. 1, each of the threads acquires a lock on the partition to which it intends to write its respective record insertion. Each of the threads must also acquire a lock on the other partition so that it can check the uniqueness constraint on the respective record that it is inserting against the other partitions. Simultaneously or nearly simultaneously to the insertion operations, a merge operation of a delta table for each of the partitions of the table is initiated. Each delta merge requires an exclusive lock to complete its operations. As shown in FIG. 1, the multiple operations can require locks on other partitions and can therefore require that at least some of the locks be queued for completion after previous locks are removed. This situation is not desirable.

Delta merges in particular can be troublesome, as they require not just a write lock or a read lock but rather an exclusive lock for at least a brief period of time during the operation. The need for an exclusive lock to perform a merge can interfere with the completion of other queued operations and can in some examples (e.g. as illustrated in FIG. 1) lead to a deadlock situation in which the locks imposed by parallel threads preclude one or more of the threads from being able to proceed to completion of its task.

Methods, systems, articles of manufacture, and the like consistent with, one or more implementations of the current subject matter can, among other possible advantages, provide an improved approach to ensuring that secondary uniqueness constraints are maintained across multiple partitions, for example among multiple partitions of a table distributed across two or more parallel processing nodes. The subject matter disclosed herein can optionally be used in conjunction with one or both of a multi-level partitioning approach such as is also described herein, as well as an independent table node approach which each server or data server process (e.g. each node) in a multi-node data partitioning landscape can manage itself as well as the partitioning of data between the data partitions and nodes.

Figure 2:
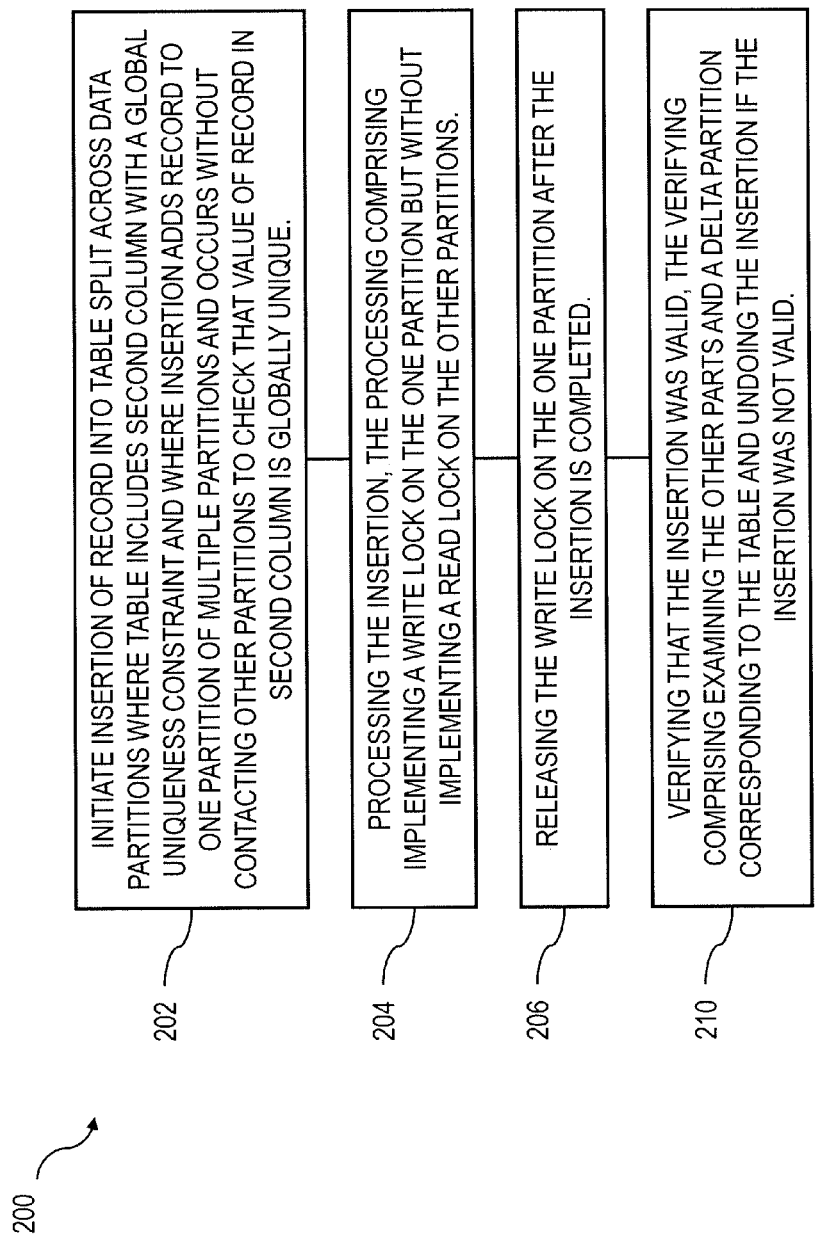
FIG. 2 is a process flow diagram illustrating aspects of a method having one or more features consistent with at least some implementations of the current subject matter.

FIG. 2 shows a process flow chart 200 illustrating method features, one or more of which can be included in implementations of the current subject matter. At 202, an insertion of a record into a table that is split across a plurality of data partitions is initiated. This insertion is performed optimistically. In other words, an assumption is made that the insertion will not violate a uniqueness constraint on a non-primary key second column that also includes a uniqueness constraint. The insertion causes the record to be added to one partition of the plurality of partitions, for example either as the insertion of a new record or as the insertion of a new version of an existing record that occurs coincident with the old version of the record being invalidated. The initiating occurs without contacting other partitions of the plurality of partitions to check that a value of the record in the second column is globally unique.

At 204, the insertion is process, for example at least by implementing a write lock on the one partition without implementing a read lock on the other partitions. After the insertion is completed, at 206 the write lock on the one partition is released. At 210, a verification is performed to determine whether the insertion was valid. The verifying includes examining the other partitions as well as a delta partition corresponding to the table to check whether the second column uniqueness constraint has been violated by the insertion. If the second column uniqueness constraint has been violated (i.e. if the insertion was not valid), the insertion is undone, for example by invalidating the record.

Figure 3:
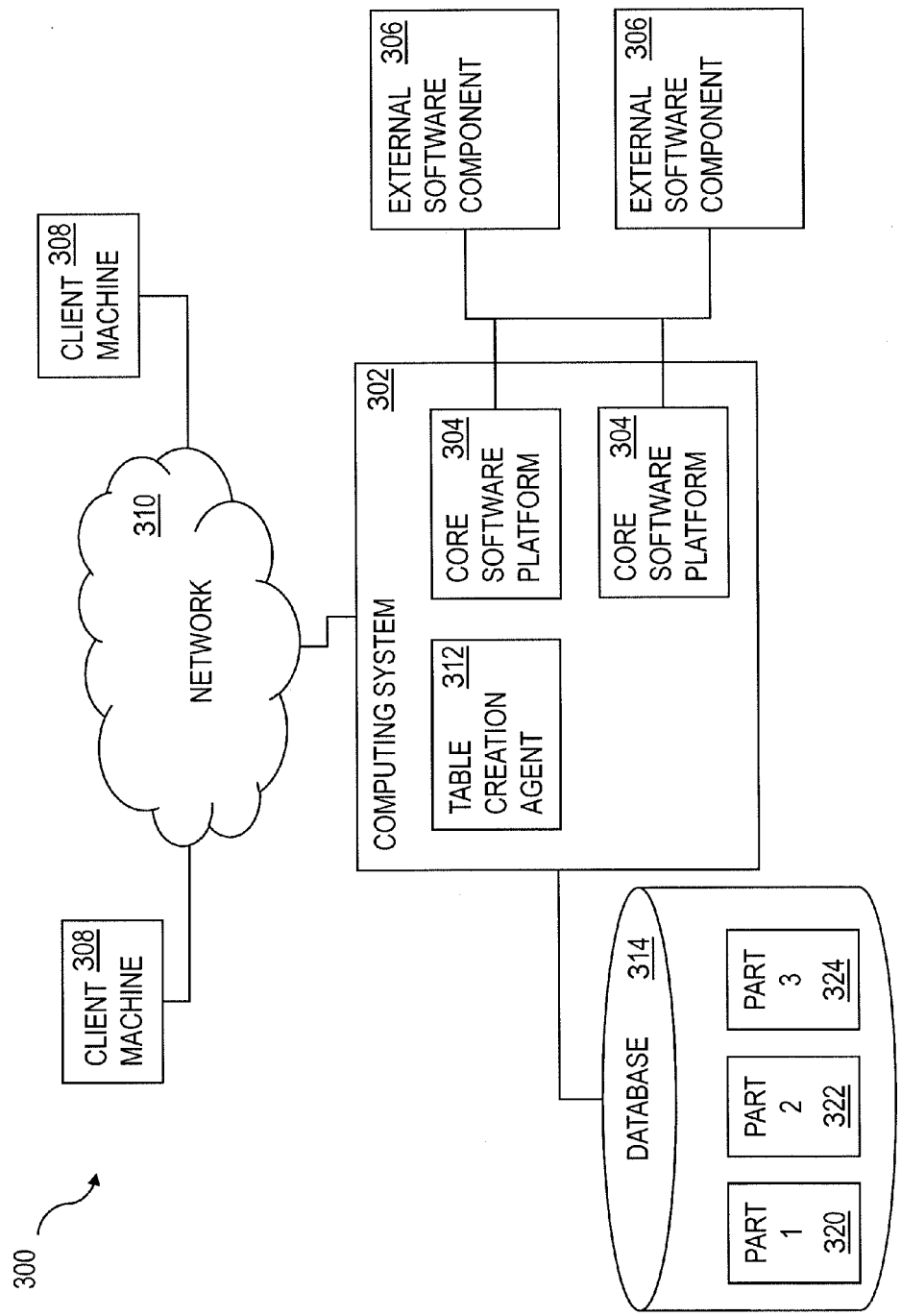
FIG. 3 is a diagram illustrating features of a business software system architecture consistent with at least some implementations of the current subject matter.

FIG. 3 shows a diagram of a system that can implement one or more features of the current subject matter. A computing system 302 can include one or more core software platform modules 304 providing one or more features of a business software system or other software that includes database management features. The computing system can also aggregate or otherwise provide a gateway via which users can access functionality provided by one or more external software components 306. One or more client machines 308 can access the computing system, either via a direct connection, a local terminal, or over a network 310 (e.g. a local area network, a wide area network, a wireless network, the Internet, or the like).

A database management agent 312 or other comparable functionality can access a database 314 that includes at least one table 316, which can in turn include at least one column. The database management agent 312 can implement an estimation algorithm that causes one or more processors of the computing system to perform one or more of the functions described herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like. A table can split across one or more data partitions 320, 322, 324, which can be accessible via a single server or server process, or alternatively via two or more parallel servers or server processes, for example as described below.

Figure 4:
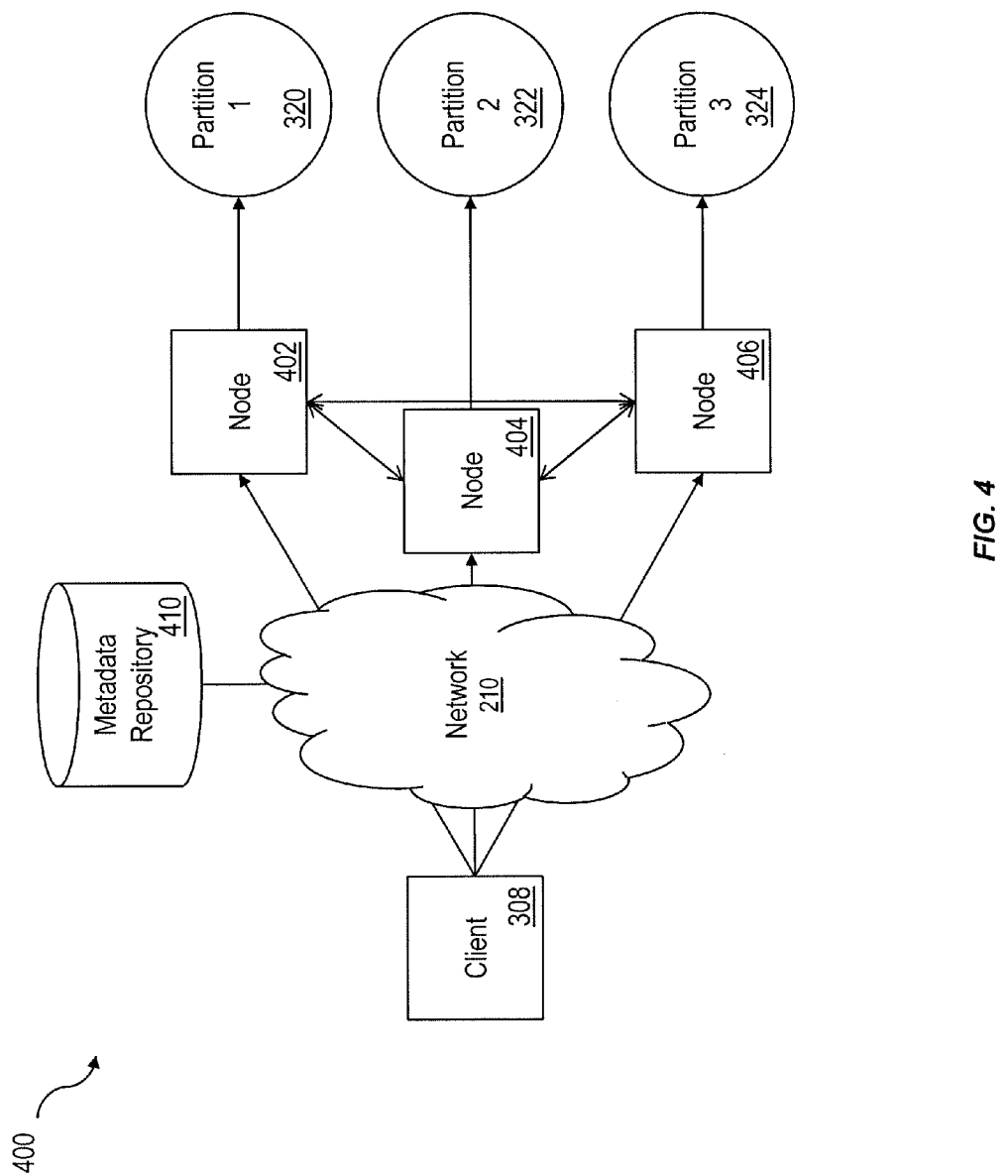
FIG. 4 is a diagram illustrating features of a independent table node partitioning approach consistent with at least some implementations of the current subject matter.

FIG. 4 shows an example of a multi-node data partitioning landscape 400 illustrating an approach to handling of data partitioned among multiple nodes in a multi-node system. As shown in FIG. 4, a client 308 can communicate with a receiving node, which can be any of a plurality of parallel nodes 402, 404, 406 that each handles at least one of a plurality of data partitions 320, 322, 324. The communication between the client 308 and the receiving node of the plurality of parallel nodes 402, 404, 406 can be via a direct connection or over a network 310 as is shown in FIG. 4. Upon receiving data, a request for data or for data processing, or the like (hereinafter referred to generically as a request) from a client machine 308, a data provider, a data consumer, or the like, the receiving node of the multiple nodes parallel nodes 402, 404, 406 examines the request and determines how the request must be directed to the available nodes based on the data partitioning in the data partitions 320, 322, 324. The receiving node then distributes the request to the other parallel nodes 402, 404, 406 as necessary. The client 308 can communicate with any one of the parallel nodes 402, 404, 406 or with more than one or with all of the parallel nodes 402, 404, 406. A metadata repository 410 or other passive resource storing metadata or other mapping data, rules, attributes, the partitioning specification or criteria, etc. can be accessible to one or more of the client 308 and the plurality of parallel nodes 402, 404, 406. The metadata repository 410 can be accessible via the network 310, as shown in FIG. 4, or via one or more of the plurality of parallel nodes 402, 404, 406 or by the client 308 via a dedicated or shared connection.

In one variation, the client 308 can be provided with a partitioning specification or criteria in advance of the request, such as for example hash functions, ranges, or other information necessary to direct the request to an appropriate one or more of the nodes 306. In such a case, the receiving node of the parallel nodes 402, 404, 406 can also perform a check of the request to ensure that the request or part of the request received by the receiving node is directed properly. In some variations, round robin partitioning can be used. For example, hash values and ranges need not be part of the partitioning plan. Rather, distribution of data storage among the data partitions 320, 322, 324 of the multiple parallel nodes 402, 404, 406 can be controlled by the client 308 itself (optionally via contact with the metadata repository 410 or other resource), which can be tasked to send at least approximately the same volume of data to each of the multiple parallel nodes 402, 404, 406. In this example, the client 308 can perform load balancing functions to at least approximately equalize the amount of data stored on each of the multiple parallel nodes 402, 404, 406.

Some implementations of the current subject matter can be used in conjunction with a multi-level partitioning approach. In one non-limiting example illustrated in FIG. 5, range partitioning according to months can be used to divide data records among multiple partitions on each of several parallel servers or data server processes. As shown in the framework 500 of FIG. 5, a database can be range partitioned into one partition for each month of the first quarter of a year. Accordingly, a level 5 first data partition 502 on a first data process server 504 is sub-partitioned into a level 2 first January partition 506, a level 2 first February partition, 508, and a level 2 first March partition 510. A level 1 second data partition 512 on a second data process server 514 is sub-partitioned into a level 2 second January partition 516, a level 2 second February partition, 518, and a level 2 second March partition 520.

Figure 5:
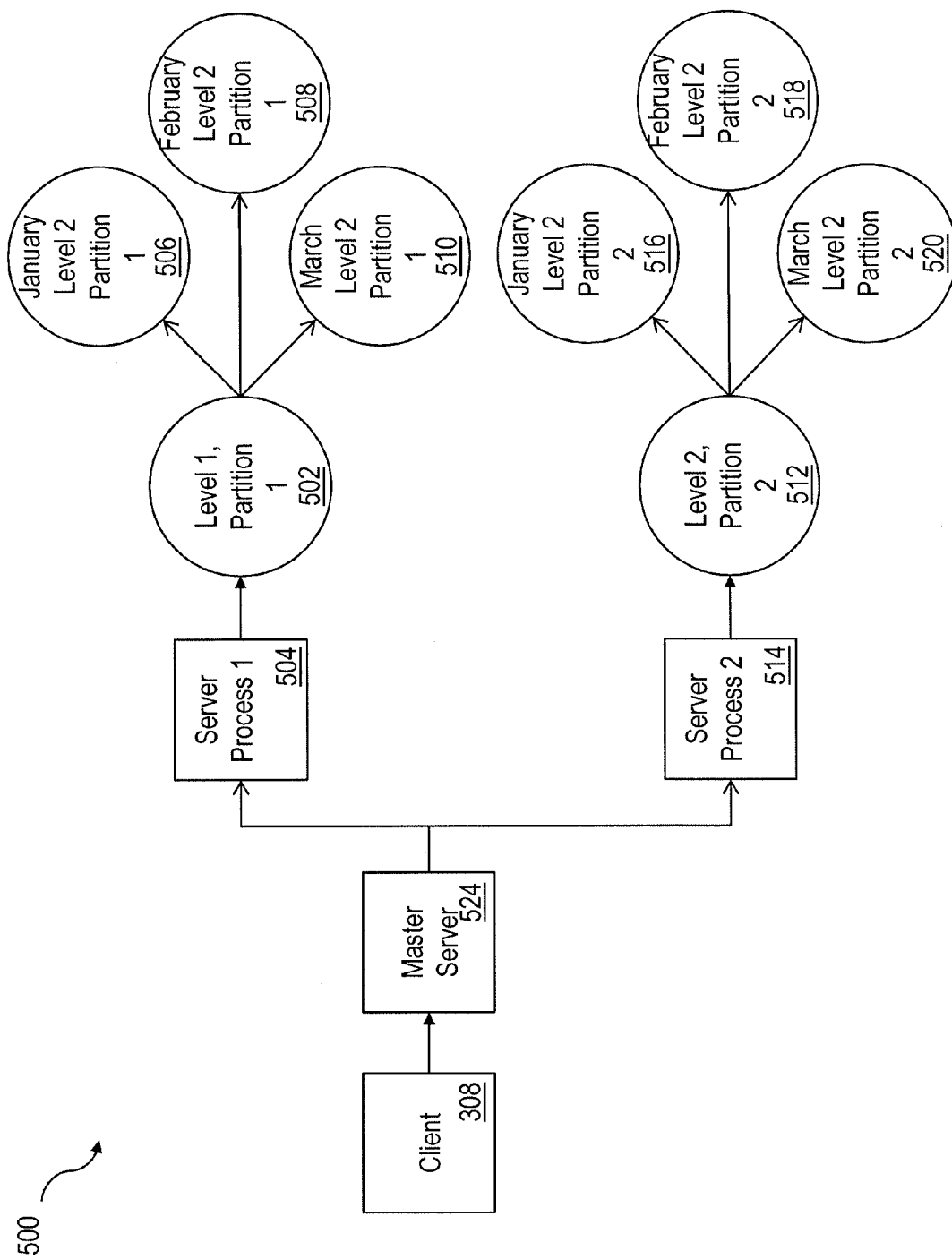
FIG. 5 is a diagram illustrating features of a multi-level partitioning approach consistent with at least some implementations of the current subject matter.

In the example illustrated in FIG. 5, the partitioning of data on the database between the level 1 first database partition 502 and the level 1 second database partition 512 can be accomplished using a hash partitioning approach in which a hash value is calculated for a data record using a hash function based on values for the data record in one or more columns of the database. FIG. 5 shows two server processes 504, 514 respectively hosting the two level 1 partitions 502, 512, but this simplified depiction is not intended as a limitation. Any number of parallel server processes with associated level 1 data partitions is within the scope of the current subject matter. Additionally, the first level partitioning need not be between two or more server processes but can instead be performed within a single server process.

FIG. 5 also shows a client 308 communicating with a master server 524 that can direct data requests and queries as well as new data to be stored to the appropriate one of the two or more level 1 data partitions 502, 512 on the two or more server processes 504, 514. In some implementations, the master server 524 can perform the calculation of the hash function to determine the hash value that dictates which of the server processes 504, 514 receives new data and where to find new data in response to a query or request. In other implementations consistent with aspects of the current subject matter, the client 308 can perform one or more of the above-noted functions of the master server 524 and can optionally eliminate the need for a separate master server 524 in distributing and maintaining data across two or more parallel server processes 504, 514. In still other implementations, the master server can be considered as a passive resource, for example a repository storing metadata or other data, rules, attributes, criteria, etc. that can be called by one or more or all of a standalone master server machine or machines, one or more index servers that can be co-located with one of the server processes 504, 514, the client 308, etc.

In addition, while the approach depicted in FIG. 5 employs hash partitioning to distribute data among the parallel server processes 504, 514 and range partitioning to further distribute data from each of the two or more level 1 partitions 502, 512 into second level partitions (e.g. sub-partitions), implementations using these or other partitioning approaches or other partitioning approaches (e.g. round robin partitioning) in a different order are also within the scope of the current subject matter. For example, range partitioning (or some other partitioning approach) can be used at the first level to distribute data among two or more parallel server processes, and hash partitioning (or some other partitioning approach different than the partitioning approach used at the first level) can be used at the second level. Range partitioning can be applied on any data that are amenable to being orders (e.g. postal codes, dates, phone numbers, catalog numbers etc.). The use of date values in range partitioning as discussed herein can be particularly advantageous in certain applications in which the date itself is a query value provided within a query of the database. In this case, the query itself can designate which level 2 partition needs to be searched to reply to the query. In still other implementations, multi-level partitioning can be performed within a single server process or physical server. In this manner, a multi-level partitioning tree structure can create multiple sub-partitions of the data storage with improved parallelism that can improve the efficiency of database operations such as indexing, merging, pruning, data retrieval, and the like.

Use of hash partitioning as the first partitioning method for the level 1 partitioning and range partitioning as the second partitioning method for the level 2 partitioning can be advantageous in enabling time-based partitioning without requiring that older data be frequently merged or compressed with newer data. In a conventional approach, data loaded into a table must eventually be merged into a main index. The timing of such a merge is typically based on the size of the main index. By partitioning at the second level according to a temporal range (e.g. month, week, year, or some other period of time), more recent (and therefore generally more frequently accessed) data records are kept together while older data records remain in partitions that do not need to be accessed (and therefore re-indexed and/or decompressed and re-compressed) as frequently.

Using hash partitioning, for example as the first partitioning method for the first level partition between the data sever processes, one or more columns containing line item numbers or some other key value that includes substantial variation among data records (varies a lot) can be chosen as the hash column. A hash value can be calculated based on the data record values in each of one or more columns using a hash function. If multiple columns are used, the hash function can include concatenation of the data record values in the multiple columns. The first partitioning method can optionally include round robin partitioning, range partitioning, or some other form or partitioning in other implementations.

The second partitioning approach, which can optionally include range partitioning (or can optionally include hash partitioning, round robin partitioning, or some other form of partitioning), can include evaluation of a second partitioning criteria based on one or more second columns, which do not include the one or more first columns used in evaluation of the first partitioning criteria. As such, while the first partitioning criteria can include a primary key value for the data record, the second partitioning criteria does not.

In further variations, an additional partitioning level can be used in addition to the level 1 and level 2 partitioning levels discussed above. For example, an additional layer can include an additional hash partitioning level. In some implementations, a third partitioning layer can be used, for example in place of history tables used to track changes to the database or one or more tables in the database.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 6:
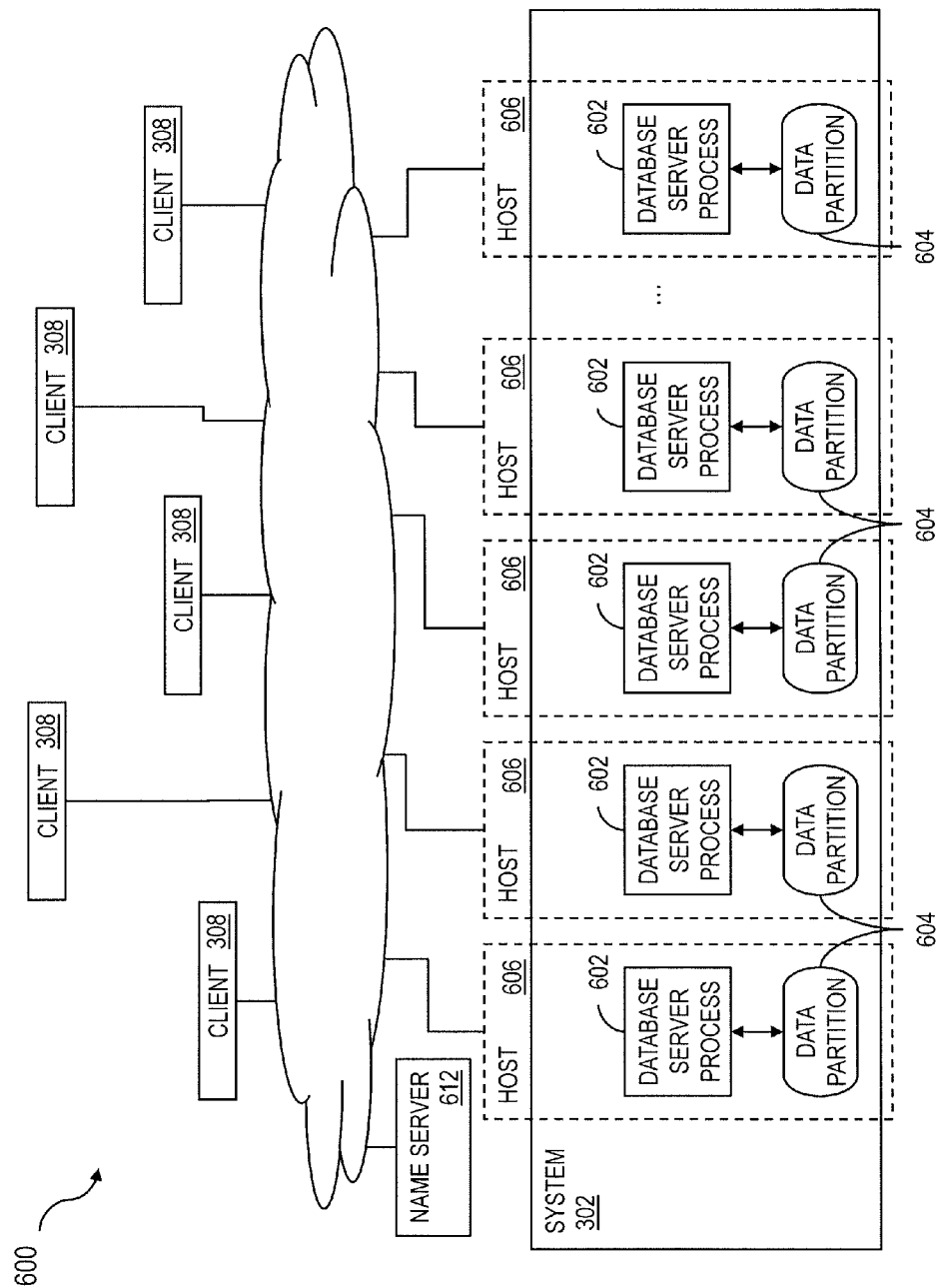
FIG. 6 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 6 shows an example of an enterprise resource system architecture 600 consistent with an implementation that includes data distribution for scalability reasons. Such a configuration can be used for large, on-premise or stand-alone systems with high performance requirements. Each data server process 602 and its associated data partition 604 can be assigned to a discrete host 606. A host 606 can be a standalone machine with one or more physical processors or a virtual machine on a larger system 302 as depicted in FIG. 6. A central component, labeled as a name server 612 in FIG. 6, knows the topology of the system and how data is distributed. In a system with data distribution, the name server knows which tables or partitions of tables are located on which data server process 602. One or more clients 614 (e.g. client machines 308) can access the name server 612, either via a direct connection or over a network 616.

In a data distribution scenario, the partitioning can be done table wise or also by splitting tables. With table wise partitioning, the name server assigns new tables to a database server process 602 based on the current distribution of tables (number of tables assigned to each database server process 602). Then data for this table will reside only on that database server process 602. It is also possible to specify that a table is split over multiple database server processes 602. The name server 612 can optionally partition the table based on a size estimation specified by the application. When records are inserted into a split table, the records can be distributed to other database server processes 602 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 7:
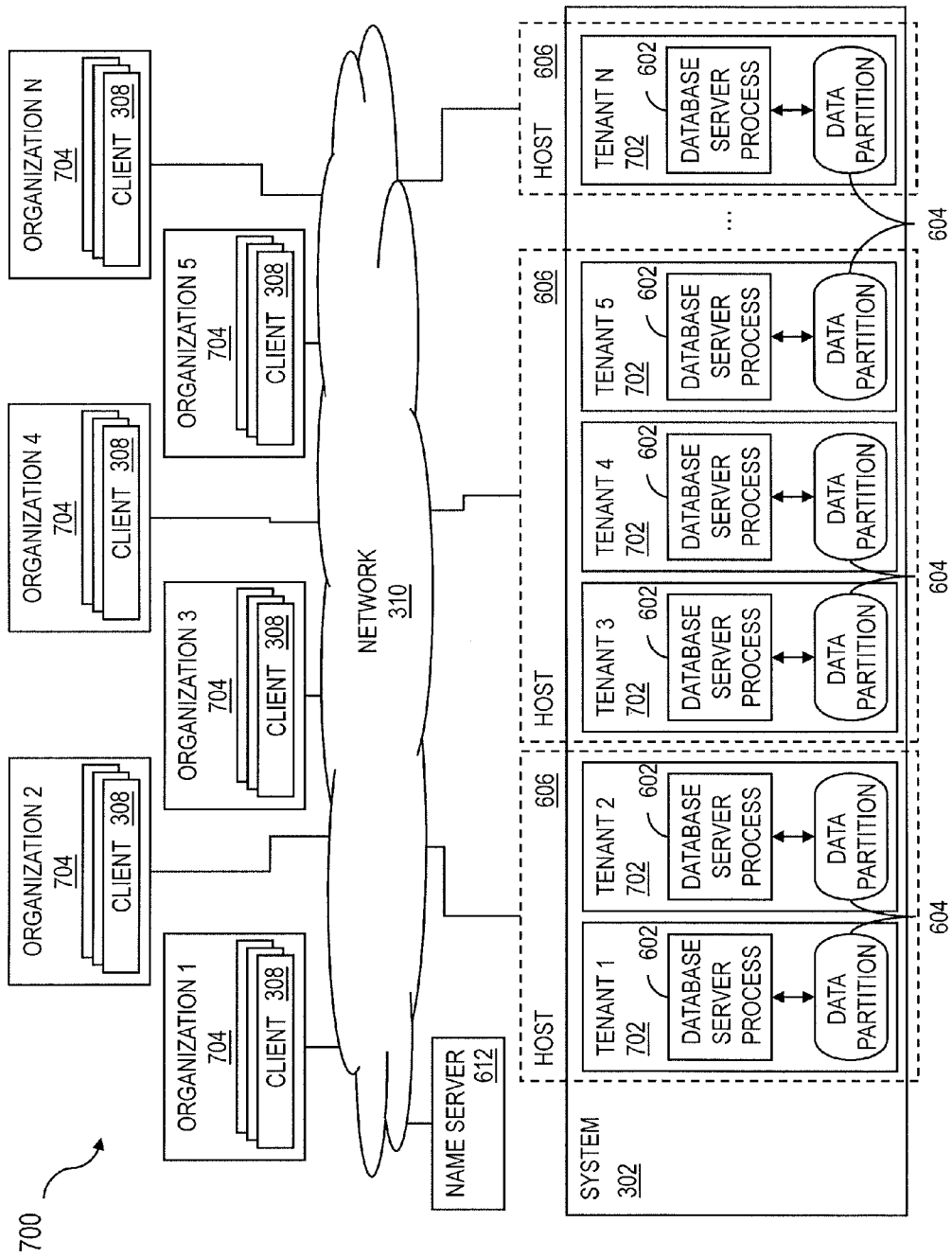
FIG. 7 is a diagram illustrating features of another database management system architecture consistent with at least some implementations of the current subject matter.

Data partitioning consistent with implementations of the current subject matter can also be used in a multi-tenancy environment as illustrated in the system architecture 700 of FIG. 7. Multiple tenants 702, each isolated from one another and available to be accessed by clients 614 within a separate organization 704 of a plurality of organizations via a network 616, can be hosted by a same host 606, which can be a virtual machine on a larger system 302 as shown in FIG. 7 or a separate system that includes one or more physical processors. Tenants 702 can also optionally be distributed across multiple database server processes 602 on more than one host 606. In this manner, tables or ranges within tables are assigned to different database server processes 602 that are assigned to different hosts 606 for scalability reasons. One or more tenants 702 can alternatively be served by a single database server process 602 accessing a data partition 604 (or multiple data partitions 604) for the respective tenant 702 that is isolated from other tenants 702.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

initiating an insertion of a record into a table that is split across a plurality of data partitions, the table comprising a primary key column and a second column that comprises a global uniqueness constraint across all of the plurality of data partitions, the insertion causing the record to be added to one partition of the plurality of partitions, the initiating occurring without contacting other partitions of the plurality of partitions to check that a value of the record in the second column is globally unique;

processing the insertion, the processing comprising implementing a write lock on the one partition but without implementing a read lock on the other partitions;

releasing the write lock on the one partition after the insertion is completed; and verifying that the insertion was valid, the verifying comprising examining the other partitions and a delta partition corresponding to the table and undoing the insertion if the insertion was not valid;

wherein the plurality of partitions are part of a multi-node data partitioning landscape comprising data partitioning over at least two partitioning levels, the table being partitioned at a first level using a range partitioning specification and at a second level using a hash partitioning specification.

2. A computer program product as in claim 1, wherein the initiating further comprises:

receiving, by a recipient node of a plurality of processing nodes each comprising at least one data partition of the plurality of data partitions, a first data request comprising the insertion, the first data request being received directly from a requesting machine without being handled by a master node, identifying, by the recipient node, a target node of the plurality of processing nodes to handle the data request, the determining comprising the recipient node applying partitioning information to determine one partition of the plurality of partitions to which the data request should be directed and mapping information associating each data partition of the plurality of data partitions with an assigned node of the plurality of processing nodes; and redirecting, by the recipient node, the data request to the target node so that the target node can act on the one partition in response to the data request.

3. A computer program product as in claim 2, further comprising accessing the partitioning information and the mapping information from at least one of a local storage accessible to the recipient node and a metadata repository accessible to each of the plurality of processing nodes.

4. A computer program product as in claim 1, wherein the table is partitioned at a first level into at least two first level partitions based on a first partitioning method, and each of the first level partitions is further partitioned at a second level into two or more second-level partitions based on a second partitioning method that is the same for all of the at least two first level partitions.

5. A system comprising:
   at least one programmable processor; and
   a non-transitory machine-readable medium storing instructions that, when executed by the at least one processor, cause the at least one programmable processor to perform operations comprising:
   initiating an insertion of a record into a table that is split across a plurality of data partitions, the table comprising a primary key column and a second column that comprises a global uniqueness constraint across all of the plurality of data partitions, the insertion causing the record to be added to one partition of the plurality of partitions, the initiating occurring without contacting other partitions of the plurality of partitions to check that a value of the record in the second column is globally unique;
   processing the insertion, the processing comprising implementing a write lock on the one partition but without implementing a read lock on the other partitions;
   releasing the write lock on the one partition after the insertion is completed; and
   verifying that the insertion was valid, the verifying comprising examining the other partitions and a delta partition corresponding to the table and undoing the insertion if the insertion was not valid;
   wherein the plurality of partitions are part of a multi-node data partitioning landscape comprising data partitioning over at least two partitioning levels, the table being partitioned at a first level using a range partitioning specification and at a second level using a hash partitioning specification.

6. A system as in claim 5, wherein the initiating further comprises:
   receiving, by a recipient node of a plurality of processing nodes each comprising at least one data partition of the plurality of data partitions, a first data request comprising the insertion, the first data request being received directly from a requesting machine without being handled by a master node,
   identifying, by the recipient node, a target node of the plurality of processing nodes to handle the data request, the determining comprising the recipient node applying partitioning information to determine one partition of the plurality of partitions to which the data request should be directed and mapping information associating each data partition of the plurality of data partitions with an assigned node of the plurality of processing nodes; and
   redirecting, by the recipient node, the data request to the target node so that the target node can act on the one partition in response to the data request.

7. A system as in claim 6, further comprising accessing the partitioning information and the mapping information from at least one of a local storage accessible to the recipient node and a metadata repository accessible to each of the plurality of processing nodes.

8. A system as in claim 5, wherein the table is partitioned at a first level into at least two first level partitions based on a first partitioning method, and each of the first level partitions is further partitioned at a second level into two or more second-level partitions based on a second partitioning method that is the same for all of the at least two first level partitions.

9. A computer-implemented method comprising:
   initiating an insertion of a record into a table that is split across a plurality of data partitions, the table comprising a primary key column and a second column that comprises a global uniqueness constraint across all of the plurality of data partitions, the insertion causing the record to be added to one partition of the plurality of partitions, the initiating occurring without contacting other partitions of the plurality of partitions to check that a value of the record in the second column is globally unique;
   processing the insertion, the processing comprising implementing a write lock on the one partition but without implementing a read lock on the other partitions;
   releasing the write lock on the one partition after the insertion is completed; and
   verifying that the insertion was valid, the verifying comprising examining the other partitions and a delta partition corresponding to the table and undoing the insertion if the insertion was not valid;
   wherein the plurality of partitions are part of a multi-node data partitioning landscape comprising data partitioning over at least two partitioning levels, the table being partitioned at a first level using a range partitioning specification and at a second level using a hash partitioning specification.

10. A computer-implemented method as in claim 9, wherein the initiating further comprises:
    receiving, by a recipient node of a plurality of processing nodes each comprising at least one data partition of the plurality of data partitions, a first data request comprising the insertion, the first data request being received directly from a requesting machine without being handled by a master node,
    identifying, by the recipient node, a target node of the plurality of processing nodes to handle the data request, the determining comprising the recipient node applying partitioning information to determine one partition of the plurality of partitions to which the data request should be directed and mapping information associating each data partition of the plurality of data partitions with an assigned node of the plurality of processing nodes; and
    redirecting, by the recipient node, the data request to the target node so that the target node can act on the one partition in response to the data request.

11. A computer-implemented method as in claim 10, further comprising accessing the partitioning information and the mapping information from at least one of a local storage accessible to the recipient node and a metadata repository accessible to each of the plurality of processing nodes.

12. A computer-implemented method as in claim 9, wherein the table is partitioned at a first level into at least two first level partitions based on a first partitioning method, and each of the first level partitions is further partitioned at a second level into two or more second-level partitions based on a second partitioning method that is the same for all of the at least two first level partitions.

13. A computer-implemented method as in claim 9, wherein at least one of the initiating, the processing, the releasing, and the verifying are performed by at least one programmable processor.

* * * * *